United States Patent
Zhang et al.

(10) Patent No.: US 10,879,976 B2
(45) Date of Patent: Dec. 29, 2020

(54) COMMUNICATIONS METHOD AND APPARATUS

(71) Applicant: HUAWEI TECHNOLOGIES CO., LTD., Shenzhen (CN)

(72) Inventors: Pengcheng Zhang, Xi'an (CN); Xiaojie Li, Xi'an (CN); Zhaohong Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/963,735

(22) Filed: Apr. 26, 2018

(65) Prior Publication Data

US 2018/0248604 A1   Aug. 30, 2018

Related U.S. Application Data

(63) Continuation of application No. PCT/CN2016/103406, filed on Oct. 26, 2016.

(30) Foreign Application Priority Data

Oct. 29, 2015   (CN) .......................... 2015 1 0715884

(51) Int. Cl.
   *H04B 7/06* (2006.01)
   *H04B 7/08* (2006.01)
   (Continued)

(52) U.S. Cl.
   CPC ......... *H04B 7/0617* (2013.01); *H04B 7/0639* (2013.01); *H04B 7/08* (2013.01); *H04L 5/0005* (2013.01); *H04W 16/26* (2013.01)

(58) Field of Classification Search
   CPC ....... H04B 7/0617; H04B 7/08; H04L 5/0005; H04W 16/26
   See application file for complete search history.

(56) References Cited

U.S. PATENT DOCUMENTS 7,804,842 B2 *   9/2010   Malik .................... H04L 12/413
9,042,276 B1     5/2015   Harel et al.
(Continued)

FOREIGN PATENT DOCUMENTS

CN   101568129 A   10/2009
CN   201478445 U   5/2010
(Continued)

OTHER PUBLICATIONS

International Search Report and Written Opinion issued in International Application No. PCT/CN2016/103406 dated Feb. 7, 2017, 19 pages.
(Continued)

*Primary Examiner* — Ronald B Abelson
(74) *Attorney, Agent, or Firm* — Fish & Richardson P.C.

(57) ABSTRACT

The present disclosure relates to example methods and communication apparatus. In one example method a base station divides a coverage area of a first antenna into at least two cells and performs weighted processing on data carried on time-frequency resources of the at least two cells to map the data carried on the time-frequency resources of the at least two cells to a channel of the first antenna. The base station combines the data carried on the time-frequency resources of the at least two cells, and either transmits at least two directional beams by using the first antenna, where the at least two directional beams have different directions, and wherein the at least two directional beams are in a one-to-one correspondence with the at least two cells, or the base station transmits one directional beam by using the first antenna.

15 Claims, 8 Drawing Sheets

(51) Int. Cl.
*H04L 5/00* (2006.01)
*H04W 16/26* (2009.01)

(56) References Cited

U.S. PATENT DOCUMENTS

| | | | |
|---|---|---|---|
| 2003/0032424 | A1 | 2/2003 | Judd et al. |
| 2006/0252461 | A1* | 11/2006 | Grant .................. H04M 1/00 |
| 2009/0247200 | A1 | 10/2009 | Hwang et al. |
| 2010/0120441 | A1 | 5/2010 | Wan et al. |
| 2010/0290382 | A1 | 11/2010 | Hui et al. |
| 2012/0172096 | A1 | 7/2012 | Samardzija et al. |
| 2014/0113676 | A1 | 4/2014 | Hamalainen et al. |
| 2016/0226612 | A1* | 8/2016 | Axmon .................. H04J 11/005 |
| 2016/0294463 | A1 | 10/2016 | He et al. |
| 2017/0026852 | A1* | 1/2017 | Jalden .................. H04W 16/28 |
| 2017/0180028 | A1 | 6/2017 | Maltsev et al. |

FOREIGN PATENT DOCUMENTS

| | | | |
|---|---|---|---|
| CN | 103907369 | A | 7/2014 |
| CN | 104219684 | A | 12/2014 |
| CN | 104871439 | A | 8/2015 |
| EP | 1566982 | A2 | 8/2005 |
| EP | 2452474 | A2 | 5/2012 |
| JP | 2008526142 | A | 7/2008 |
| JP | 2010527166 | A | 8/2010 |
| JP | 2014509100 | A | 4/2014 |
| WO | 2010124241 | A2 | 10/2010 |

OTHER PUBLICATIONS

R1-090585 Texas Instruments,"Joint Processing Downlink COMP Precoding Support",3GPP TSG RAN WG1 #56, Athens, Greece, Feb. 9-13, 2009,total 6 pages.

Extended European Search Report issued in European Application No. 16859022.2 dated Oct. 2, 2018, 11 pages.

Chang-guo et al., "A method to synthesize sector beam using phased antenna arrays," Journal of China Institute of Communications, vol. 24, No. 6, Jun. 2003, 5 pages.

Kim et al., "Downlink Beamforming in Small Cells with Scalar Information Exchange," 2014 International Conference on Information and Communication Technology Convergence (ICTC), Oct. 22, 2014, pp. 446-449.

Office Action issued in Chinese Application No. 201510715884.3 dated May 29, 2019, 9 pages (with English translation).

Office Action issued in Japanese Application No. 2018-521943 dated Jul. 1, 2019, 20 pages (with English translation).

* cited by examiner

COMMUNICATIONS METHOD AND APPARATUS

CROSS-REFERENCE TO RELATED APPLICATIONS

This application is a continuation of International Application No. PCT/CN2016/103406, filed on Oct. 26, 2016, which claims priority to Chinese Patent Application No. 201510715884.3, filed on Oct. 29, 2015. The disclosures of the aforementioned applications are hereby incorporated by reference in their entireties.

TECHNICAL FIELD

The present invention relates to the field of mobile communications technologies, and in particular, to a communications method and apparatus.

BACKGROUND

A cellular communications network is a main networking mode of a mobile communications system. With development of mobile communications technologies, a communications network capacity needs to be greatly improved, so as to meet a user requirement.

To improve a network capacity of the cellular communications network, a multi-sector networking mode may be used during networking. In the multi-sector networking mode, each base station is equipped with multiple directional antennas, and the multiple directional antennas have different directions. A coverage area of a base station is divided into multiple physical sectors, and each physical sector has its own transmit and receive antennas. A cell is configured for each physical sector of the base station, and a radio resource is configured for each cell. The base station allocates the radio resource of each cell to user equipment that camps on the cell, and then uses a directional antenna corresponding to the cell to direct a beam at the user equipment by means of beamforming, so as to send, by using the beam and to corresponding user equipment, data carried on the radio resource allocated to the user equipment. Directional antennas corresponding to all cells have different directions, that is, radiated beams have different directions. Therefore, these cells can use a same frequency band or close frequency bands without interfering with each other, so that a spectrum resource can be reused, to improve a network capacity.

As a quantity of users continuously increases, a requirement for a network capacity of a mobile communications system dramatically increases. Currently, a manner in which a conventional multi-sector networking technology is used to improve a network capacity cannot meet a user requirement.

SUMMARY

To resolve a problem about a limited network capacity of a communications system in the prior art, embodiments of the present invention provide a communications method and apparatus. The technical solutions are as follows:

According to a first aspect, an embodiment of the present invention provides a communications method, where the method includes:

dividing, by a base station, a coverage area of a first antenna into at least two cells; performing, by the base station, weighted processing on data carried on time-frequency resources of the at least two cells; combining, by the base station, the data that is carried on the time-frequency resources of the at least two cells and that is obtained after the weighted processing, to obtain combined data; and transmitting, by the base station, at least two directional beams by using the first antenna, where the at least two directional beams are used to send the combined data, the at least two directional beams have different directions, the at least two directional beams are in a one-to-one correspondence with the at least two cells, and beam directions of the at least two directional beams are directed by the base station according to location distribution of all terminals in cells corresponding to the directional beams; or transmitting, by the base station, one directional beam by using the first antenna, where the directional beam is used to send the combined data, and a beam direction of the directional beam is directed by the base station according to a location of a single terminal in the at least two cells.

Therefore, based on the foregoing technical solution, a base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity.

In an implementation manner of the first aspect, the performing, by the base station, weighted processing on data carried on time-frequency resources of the at least two cells includes:

multiplying, by the base station, data carried on a time-frequency resource of each cell by a directional beam weight vector of the cell, to obtain data that is mapped from the time-frequency resource to each channel of the first antenna.

In another implementation manner of the first aspect, the multiplying, by the base station, data carried on a time-frequency resource of each cell by a directional beam weight vector of the cell, to obtain data that is mapped from the time-frequency resource to each channel of the first antenna includes:

multiplying, by the base station, the data carried on the time-frequency resource of each cell by a cell beam weight vector of the cell, where the cell beam weight vector is used to form a directional beam that covers a corresponding cell or covers a part of an area of a corresponding cell; or multiplying, by the base station, the data carried on the time-frequency resource block of each cell by a service beam weight vector of the cell, where the service beam weight vector is used to form a directional beam directed at a terminal in the cell.

A base station multiplies data carried on a time-frequency resource of each cell by a different directional beam weight vector. Finally, a directional beam that covers a cell or a directional beam directed at a terminal may be formed according to an actual requirement.

Preferably, the directional beam weight vector is further used to control transmit power of the directional beam, and the transmit power is determined according to a network key performance indicator KPI. The key performance indicator includes terminal distribution in a cell, a service type, a traffic load, and the like. The transmit power of the directional beam is determined according to the KPI, and further, a directional beam weight vector corresponding to the transmit power is determined, so that the directional beam can achieve optimal coverage and an optimal capacity gain.

In another implementation manner of the first aspect, the combining, by the base station, the data carried on the time-frequency resources of the at least two cells includes:

when the at least two cells use a same frequency band, processing data of a same frequency according to the following formula: $(s1+s2+ \ldots +Sn)*e^{jw0t}$, where n represents a quantity of cells covered by the first antenna, $n \geq 2$, S1 to Sn represent signals from all cells, w0 is frequency information of S1 to Sn, and $e^{jw0t}$ represents that a signal is modulated to a carrier whose frequency is w0; or when the at least two cells use non-overlapping frequency bands, processing data of different frequencies according to the following formula: $S1*e^{jw1t}+S2*e^{jw2t}+ \ldots +Sn*e^{jwnt}$, where n represents a quantity of cells covered by the first antenna, $n \geq 2$, S1 to Sn represent signals from all cells, w1 is frequency information of S1, w2 is frequency information of S2, ..., and wn is frequency information of Sn, and $e^{jwnt}$ represents that a signal is modulated to a carrier whose frequency is wn.

That is, at least two cells covered by a same antenna may use a same frequency band, or may use non-overlapping frequency bands.

According to a second aspect, an embodiment of the present invention provides a communications method, where the method includes:

dividing, by a base station, a coverage area of a second antenna into at least two cells, where the base station has at least one antenna, and the second antenna is any one of the at least one antenna;

receiving, by the base station, a signal by using the second antenna; and processing, by the base station, signals received by all channels of the second antenna, to obtain receive data of the at least two cells.

Therefore, based on the foregoing technical solution, a base station receives signals of at least two cells by using a second antenna. These cells have their own transmission bandwidth. For a coverage area of an antenna, total transmission bandwidth that can be used dramatically increases, thereby improving a network capacity.

In an implementation manner of the second aspect, the processing, by the base station, signals received by all channels of the second antenna, to obtain receive data of the at least two cells includes:

separately performing, by the base station in a unit of cell, single cell processing on the signals received by all channels of the second antenna; or simultaneously performing, by the base station, joint detection processing on the signals received by all channels of the second antenna.

Therefore, a base station may process, in a unique manner, a signal received by a second antenna, to obtain receive data of at least two cells.

According to a third aspect, an embodiment of the present invention provides a communications apparatus, where the apparatus includes: a module, configured to execute the method according to the first aspect.

According to a fourth aspect, an embodiment of the present invention provides a communications apparatus, where the apparatus includes: a module, configured to execute the method according to the second aspect.

According to a fifth aspect, an embodiment of the present invention provides a communications apparatus, where the apparatus includes: a memory, a communications interface, and a processor that is connected to the memory and the communications interface. The memory is configured to store an instruction, the processor is configured to execute the instruction, and the communications interface is configured to perform communication under control of the processor. When executing the instruction, the processor may execute the method according to the first aspect.

According to a sixth aspect, an embodiment of the present invention provides a communications apparatus, where the apparatus includes: a memory, a communications interface, and a processor that is connected to the memory and the communications interface. The memory is configured to store an instruction, the processor is configured to execute the instruction, and the communications interface is configured to perform communication under control of the processor. When executing the instruction, the processor may execute the method according to the second aspect.

According to a seventh aspect, an embodiment of the present invention provides: a computer readable medium, configured to store program code executed by a communications apparatus, where the program code includes an instruction used to execute the method according to the first aspect.

According to an eighth aspect, an embodiment of the present invention provides: a computer readable medium, configured to store program code executed by a communications apparatus, where the program code includes an instruction used to execute the method according to the second aspect.

The technical solutions provided in the embodiments of the present invention bring the following beneficial effects:

A base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity. In addition, a beam that covers a cell is directed by processing a baseband signal. Therefore, the embodiments of the present invention may be implemented based on an existing base station antenna structure, so that hardware costs of an antenna system do not increase.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

To facilitate understanding of the solutions of the present invention, the following uses a cellular communications system as an example to describe a networking structure of the present invention.

It should be understood that, cellular communications systems in the embodiments of the present invention include but are limited to: a Global System for Mobile Communications ("GSM" for short) system, a Code Division Multiple Access ("CDMA" for short) system, a Wideband Code Division Multiple Access ("WCDMA" for short) system, a general packet radio service "GPRS" for short), a Long Term Evolution ("LTE" for short) system, an LTE frequency division duplex ("FDD" for short) system, an LTE time division duplex (Time Division Duplex, "TDD" for short) system, a Universal Mobile Telecommunications System ("UMTS" for short), a Worldwide Interoperability for Microwave Access ("WiMAX" for short) communications system or the like.

In a cellular communications network, a base station may use an omnidirectional antenna to implement cell coverage, or may use multiple directional antennas to implement cell coverage. In the embodiments of the present invention, a base station that uses 120-degree directional antennas to implement cell coverage is described in detail, that is, a base station is equipped with three directional antennas, the three directional antennas have different directions, and each antenna covers a range of 120 degrees. In the embodiments of the present invention, a directional antenna may be a single antenna, or may be a smart antenna that includes multiple antenna units.

Figure 1A:
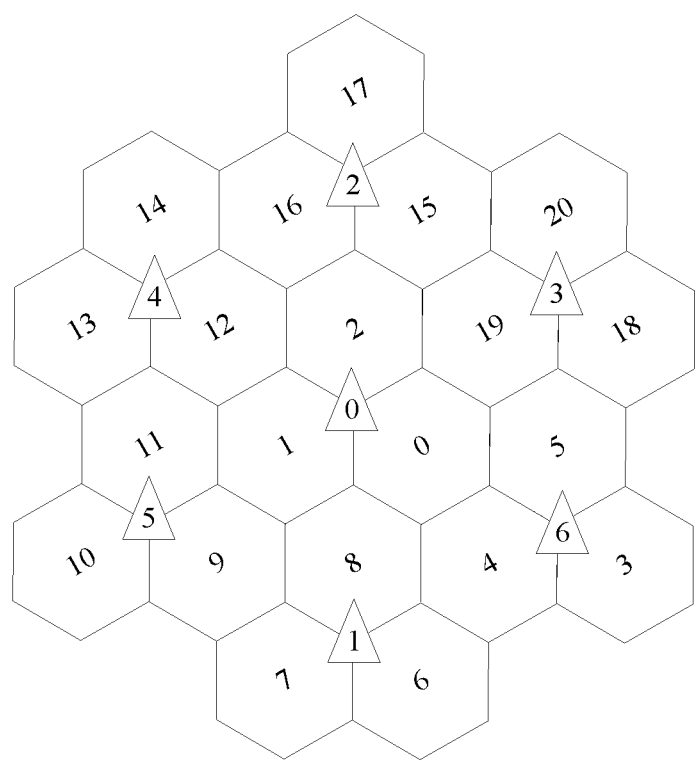
FIG. 1a is a schematic diagram of a networking structure provided in the prior art.

FIG. 1*a* shows an existing three-sector cellular networking mode. In FIG. 1*a*, a triangular represents a base station. As shown in FIG. 1*a*, a coverage area of the base station is divided into hexagons, and each hexagon is corresponding to a cell. Each base station is disposed at a common cross-connection point of three hexagons. One directional antenna is corresponding to one cell (that is, one hexagon), and one base station can cover three cells. It is assumed that transmission bandwidths of the three cells are all set to a MHz.

Figure 1B:
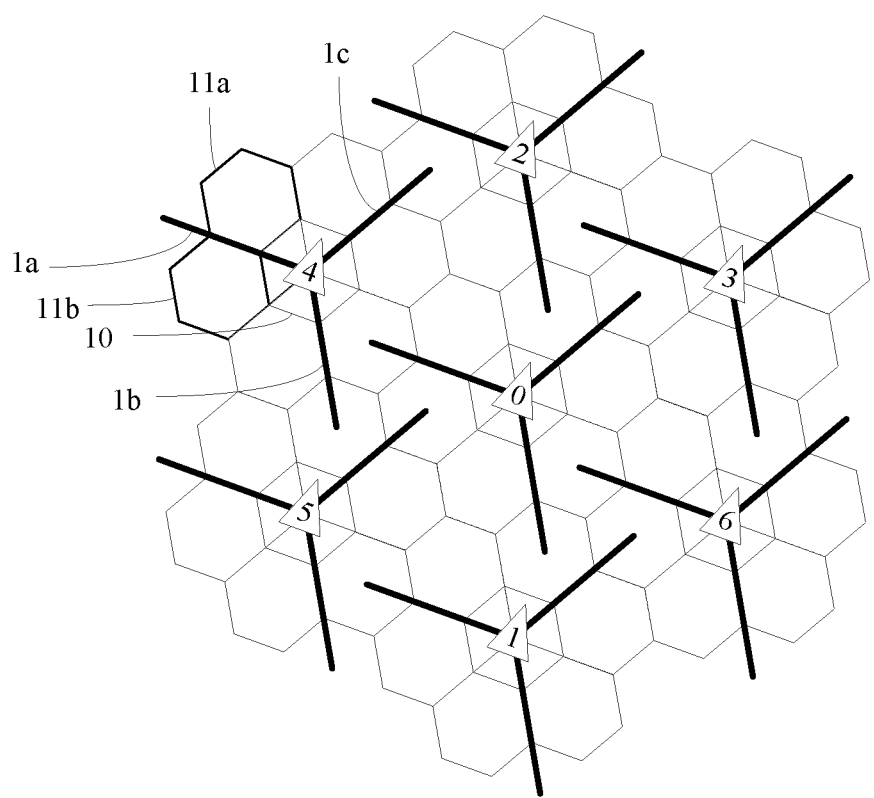
FIG. 1b is a schematic diagram of a networking structure according to an embodiment of the present invention.

FIG. 1*b* shows a cellular networking structure of the present invention. In FIG. 1*b*, similarly, a triangular is used to represent a base station. In FIG. 1*b*, a black thick line extended from a triangular represents an antenna. A base station 4 is used as an example for specific description. As shown in FIG. 1*b*, the base station 4 has three directional antennas 1*a*, 1*b*, and 1*c*. The base station 4 is disposed in a central area of a hexagon 10. A coverage area of each directional antenna is divided into two cells, for example, a coverage area of the directional antenna 1*a* is divided into cells 11*a* and 11*b*, so that the base station 1 can cover six cells (corresponding to seven hexagons). It can be seen from FIG. 1*b* that neither the cell 11*a* nor the cell 11*b* is a regular hexagon. However, when formed together, multiple cells may be quantized as hexagons, so as to form multiple standard cellular sets.

In the networking mode shown in FIG. 1*b*, spatial directional processing is performed on beams transmitted by a directional antenna, so that one directional antenna can generate beams in two directions. A beam in one direction covers one cell, so that one directional antenna can cover two cells. In FIG. 1*b*, a coverage area of one antenna can cover two cells. A transmission bandwidth of each cell may be separately set (for example, be set to a MHz). In this case, a transmission bandwidth of a coverage area of one directional antenna is 2a MHz, and is twice as much as a transmission bandwidth (a MHz) of a coverage area of one antenna shown in FIG. 1*a*. That is, in a coverage area of one antenna, a transmission bandwidth is doubled. It is easy to learn that higher transmission bandwidth indicates a larger system capacity, so that in the networking mode shown in FIG. 1*b*, a system capacity of a communications system is dramatically improved.

It should be noted that in the cellular networking mode shown in FIG. 1*b*, one directional antenna generates beams in two directions. In another cellular networking mode, one directional antenna can generate beams in more than two directions, such as beams in three or four directions. The present invention sets no limitation thereto. In this case, one directional antenna can cover three cells, four cells, or more cells. Similarly, an example in which a transmission bandwidth of each cell is a MHz is used. In this case, a transmission bandwidth of a coverage area of one directional antenna is 3a MHz or 4a MHz, and is three times, four times, or more times as much as a transmission bandwidth (a MHz) of a coverage area of one antenna shown in FIG. 1*a*. That is, compared with that in the networking mode shown in FIG. 1*b*, a system capacity of a communications system is greatly improved.

In this embodiment of the present invention, a coverage area of an antenna is divided into multiple cells, and each cell has its own transmission bandwidth. Therefore, for a coverage area of a same antenna, total transmission bandwidth that can be used by the antenna dramatically increases, and further, a system capacity of a communications system can be dramatically improved. In addition, a beam that covers a cell is directed by processing a baseband signal. Therefore, this embodiment of the present invention may be implemented based on an existing base station antenna structure, so that hardware costs of an antenna system do not increase.

The following further describes the present invention with reference to specific embodiments.

Figure 2:
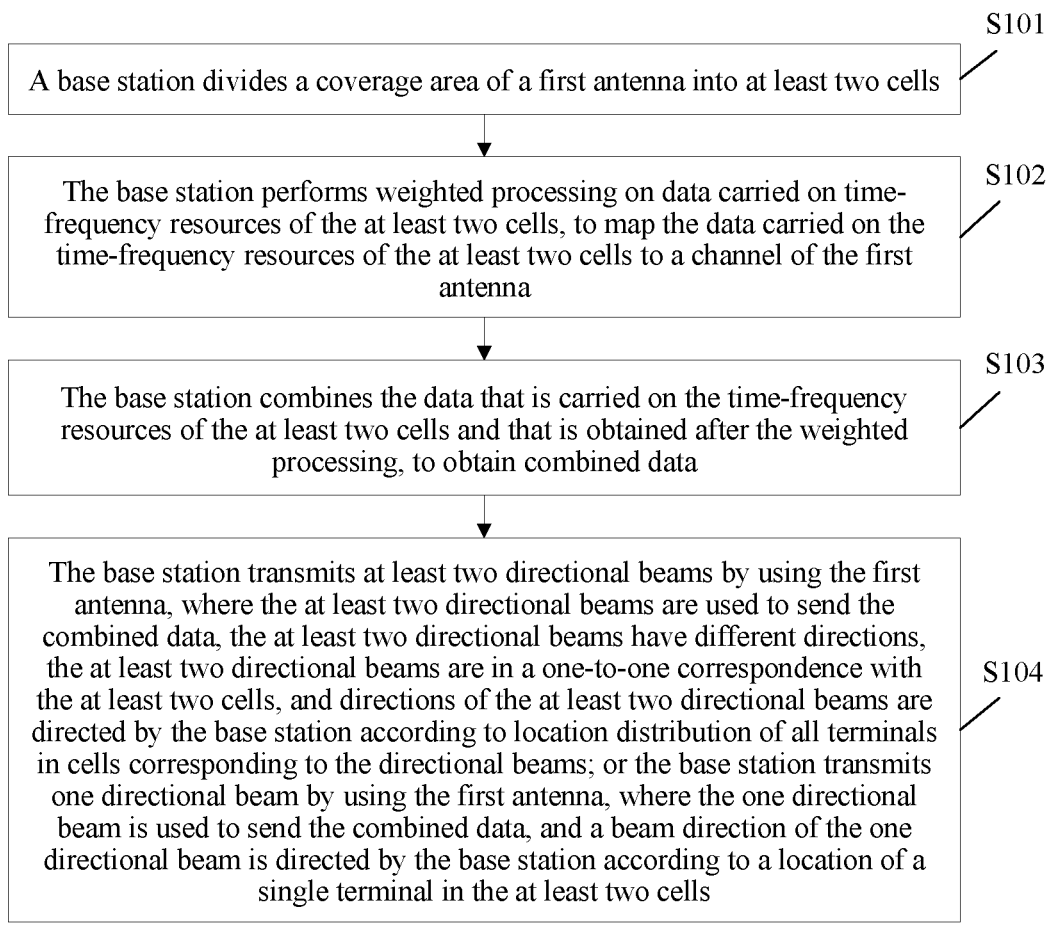
FIG. 2 is a flowchart of a communications method according to an embodiment of the present invention.

FIG. 2 shows a communications method according to an embodiment of the present invention. The method may be executed by any appropriate apparatus, such as a base station, but the present invention is not limited thereto. The method is applicable to a cellular communications system. Referring to FIG. 2, the method includes the following steps.

Step S101: A base station divides a coverage area of a first antenna into at least two cells.

In this embodiment, each cell has its own cell identifier (for example, a physical cell identifier (Physical Cell Identifier, "PCI" for short)) and a frequency domain resource (that is, transmission bandwidth).

The base station has at least one antenna. The antenna may be a directional antenna, or may be an omnidirectional antenna. When the antenna is an omnidirectional antenna, the base station has one antenna; or when the antenna is a directional antenna, the base station has at least two antennas, for example, may have three 120-degree directional antennas.

The first antenna is any one of the at least one antenna, and is configured to send data carried on a time-frequency resource of a cell in a coverage area of the antenna.

According to a Shannon (shannon) theorem, data transmission needs some bandwidth and time. The bandwidth is a frequency domain resource, and the time is a time domain resource. In this embodiment of the present invention, a time-frequency resource is a radio resource that is used for data transmission in a cell and is defined in two dimensions of a time domain and a frequency domain.

The frequency domain resource may be described as a channel resource, and is generally classified into a service channel resource and a control channel resource.

Step S102: The base station performs weighted processing on data carried on time-frequency resources of the at least two cells, to map the data carried on the time-frequency resources of the at least two cells to a channel of the first antenna.

By means of step S102, beamforming may be performed on a beam that is used to transmit data carried on time-frequency resources of two cells.

Step S103: The base station combines the data that is carried on the time-frequency resources of the at least two cells and that is obtained after the weighted processing, to obtain combined data.

Step S104: The base station transmits at least two directional beams by using the first antenna, where the at least two directional beams are used to send the combined data, the at least two directional beams have different directions, the at least two directional beams are in a one-to-one correspondence with the at least two cells, and directions of the at least two directional beams are directed by the base station according to location distribution of all terminals in cells corresponding to the directional beams; or the base station transmits one directional beam by using the first antenna, where the directional beam is used to send the combined data, and a beam direction of the directional beam is directed by the base station according to a location of a single terminal in the at least two cells.

For example, if all terminals in a cell are located in a left side of the cell, and all terminals in another cell are located in a right side of the cell, the first antenna transmits two directional beams, where one directional beam directs a left side of a cell, and the other directional beam directs a right side of another cell. If a terminal is located in an overlapping area of two neighboring cells, the first antenna transmits a directional beam, and the directional beam is directed at the overlapping area of the two neighboring cells.

During implementation, step S104 may further include: transmitting, by the base station, at least two directional beams by using the first antenna, where the at least two directional beams are used to send the combined data, the at least two directional beams have different directions, the at least two directional beams are in a one-to-one correspondence with the at least two cells, and the at least two directional beams are directed at terminals in corresponding cells; for example, an example in which two beams are corresponding to two cells is used: One directional beam is directed at a terminal a in a cell A, and the other directional beam is directed at a terminal b in a cell B.

In this embodiment of the present invention, a base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity. In addition, a beam that covers a cell is directed by processing a baseband signal. Therefore, this embodiment of the present invention may be implemented based on an existing base station antenna structure, so that hardware costs of an antenna system do not increase. In addition, the base station may determine, according to actual location distribution of terminals in a cell, that the first antenna transmits one directional beam or multiple directional beams, so that the implementation is flexible.

Figure 3:
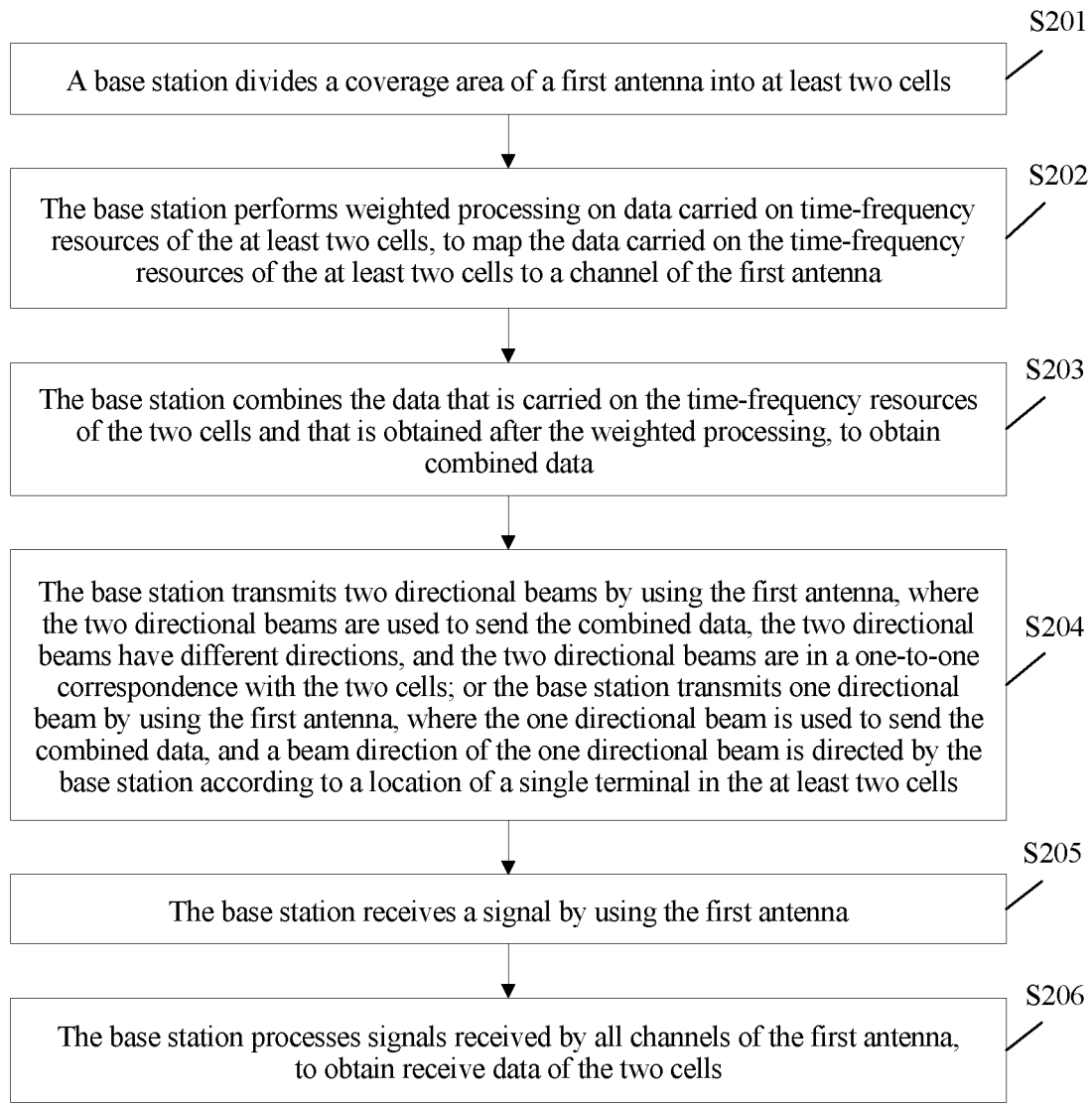
FIG. 3 is a flowchart of another communications method according to an embodiment of the present invention.

FIG. 3 shows another communications method according to an embodiment of the present invention. The communications method shown in FIG. 3 is further specific description of the communications method shown in FIG. 2. The method of this embodiment may be implemented based on the networking structure shown in FIG. 1*b*. In this embodiment, an example in which an antenna covers two cells is used for specific description, and the two cells are a first cell and a second cell. Certainly, the present invention is not limited thereto. Referring to FIG. 3, the method includes the following steps.

Step S201: A base station divides a coverage area of a first antenna into two cells.

In this embodiment, each cell has its own cell identifier (for example, a physical cell identifier (Physical Cell Identifier, "PCI" for short)) and a frequency domain resource (that is, transmission bandwidth).

The base station has at least one antenna. The antenna may be a directional antenna, or may be an omnidirectional antenna. When the antenna is an omnidirectional antenna, the base station has one antenna; or when the antenna is a directional antenna, the base station has at least two antennas, for example, may have three 120-degree directional antennas.

The first antenna is any one of the at least one antenna, and is configured to send data carried on a time-frequency resource of a cell in a coverage area of the antenna.

According to a Shannon (shannon) theorem, data transmission needs some bandwidth and time. The bandwidth is a frequency domain resource, and the time is a time domain resource. In this embodiment of the present invention, a time-frequency resource is a radio resource that is used for data transmission in a cell and is defined in two dimensions of a time domain and a frequency domain.

The frequency domain resource may be described as a channel resource, and is generally classified into a service channel resource and a control channel resource.

The following uses an LTE system as an example for specific description. In the LTE system, a control channel resource includes a common control channel resource and a user control channel resource. The common control channel resource mainly includes a physical broadcast channel (Physical Broadcast Channel, "PBCH" for short), a primary synchronization channel, a secondary synchronization channel, and some physical downlink control channels (Physical Downlink Control Channel, "PDCCH" for short). The user control resource mainly includes a PDCCH and a physical HARQ indicator channel (Physical Hybrid ARQ Indicator Channel, "PHICH" for short). Certainly, the present invention sets no limitation thereto. In another communications system, a control channel resource may be only distinguished from a user channel resource, and the control channel resource is not further distinguished.

Step S202: The base station performs weighted processing on data carried on time-frequency resources of the two cells, to map the data carried on the time-frequency resources of the two cells to a channel of the first antenna.

By means of step S202, beamforming may be performed on a beam that is used to transmit data carried on time-frequency resources of two cells.

Specifically, step S202 may include:

multiplying, by the base station, data carried on a time-frequency resource of each cell by a directional beam weight vector of the cell, to obtain data that is mapped from the time-frequency resource to each channel of the first antenna, so that when the first antenna sends the data carried on the time-frequency resource of each cell, two beams that have different directions are formed.

A quantity of weights in the directional beam weight vector of each cell is the same as a quantity of channels of the antenna, and a weight in the directional beam weight vector of each cell is set in a one-to-one correspondence with a channel of the antenna.

During implementation, the directional beam weight vector is further used to control transmit power of a directional beam, and the transmit power is set according to a network key performance indicator (Key Performance Indicator, "KPI" for short). The KPI includes terminal distribution in a cell, a service type, a traffic load, and the like. The transmit power of the directional beam is determined according to the KPI, and further, a directional beam weight vector corresponding to the transmit power is determined, so that the directional beam can achieve optimal coverage and an optimal capacity gain.

Further, the multiplying, by the base station, data carried on a time-frequency resource of each cell by a directional beam weight vector of the cell, to obtain data that is mapped from the time-frequency resource to each channel of the first antenna may include:

multiplying, by the base station, the data carried on the time-frequency resource of each cell by a cell beam weight vector of the cell, where the cell beam weight vector is used to form a directional beam that covers (a part of or all of) a corresponding cell; or multiplying, by the base station, the data carried on the time-frequency resource block of each cell by a service beam weight vector of the cell, where the service beam weight vector is used to form a directional beam directed at a terminal in the cell.

The cell beam weight vector is generated according to an indicator of an antenna, such as a basic array directivity pattern, a beam direction, a main lobe width, or side lobe suppression, so that multiple independent beams can be formed in complementary coverage areas by using the antenna. During implementation, determining of the cell beam weight vector may be adjusted according to the indicator of the antenna. The present invention sets no limitation thereto. In an implementation manner, cell beam weight vectors of two cells may be set to be orthogonal to each other, so that there is excessively small coherency between beams that cover the two cells, that is, there is a small overlapping part between the beams.

The service beam weight vector is a beam weight obtained by means of feature decomposition of a channel of a terminal to which a time-frequency domain resource in the cell is allocated; or the service beam weight vector is a weight codebook fed back by a terminal to which a time-frequency domain resource in the cell is allocated.

The following uses an 8-channel antenna as an example to describe implementation of directional coverage of broadcast signals of two cells by setting cell beam weight vectors of the two cells. Using an LTE system as an example, a time-frequency resource includes multiple time-frequency resource blocks, and a time-frequency resource block is a smallest unit of resource scheduling in the LTE system. For data on each time-frequency resource block, weighted processing may be specifically performed according to the following formula:

$$\begin{bmatrix} Y^0(n_s, k, l) \\ Y^1(n_s, k, l) \\ Y^2(n_s, k, l) \\ Y^3(n_s, k, l) \\ Y^4(n_s, k, l) \\ Y^5(n_s, k, l) \\ Y^6(n_s, k, l) \\ Y^7(n_s, k, l) \end{bmatrix} = \begin{bmatrix} w_{0R} & w_{0L} & 0 & 0 \\ w_{1R} & w_{1L} & 0 & 0 \\ w_{2R} & w_{2L} & 0 & 0 \\ w_{3R} & w_{3L} & 0 & 0 \\ 0 & 0 & w_{4R} & w_{4L} \\ 0 & 0 & w_{5R} & w_{5L} \\ 0 & 0 & w_{6R} & w_{6L} \\ 0 & 0 & w_{7R} & w_{7L} \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} P^0_{sector\ 0}(n_s, k, l) \\ P^0_{sector\ 1}(n_s, k, l) \\ P^1_{sector\ 0}(n_s, k, l) \\ P^1_{sector\ 1}(n_s, k, l) \end{bmatrix},$$

where $(n_s, k, l)$ is an index of the time-frequency resource block, $n_s$ represents a timeslot, k represents a carrier, l represents a symbol, and a resource block can be uniquely identified by using the index $(n_s, k, l)$; $Y^i(n_s,k,l)$ represents data of an $i^{th}$ channel corresponding to the time-frequency resource block $(n_s, k, l)$, n is a cell label, Sector n represents a cell n, and $P_{sector\ n}^m(n_s,k,l)$ represents data sent by a port m of the cell n (a port of a cell refers to a logical port that is configured to send a reference signal of the cell);

$$\begin{bmatrix} w_{0R} \\ w_{1R} \\ w_{2R} \\ w_{3R} \end{bmatrix} \text{ and } \begin{bmatrix} w_{4R} \\ w_{5R} \\ w_{6R} \\ w_{7R} \end{bmatrix}$$

represent beam weights of a cell 0; and $$\begin{bmatrix} w_{0L} \\ w_{1L} \\ w_{2L} \\ w_{3L} \end{bmatrix} \text{ and } \begin{bmatrix} w_{4L} \\ w_{5L} \\ w_{6L} \\ w_{7L} \end{bmatrix}$$

represent beam weights of a cell 1.

Figure 4A:
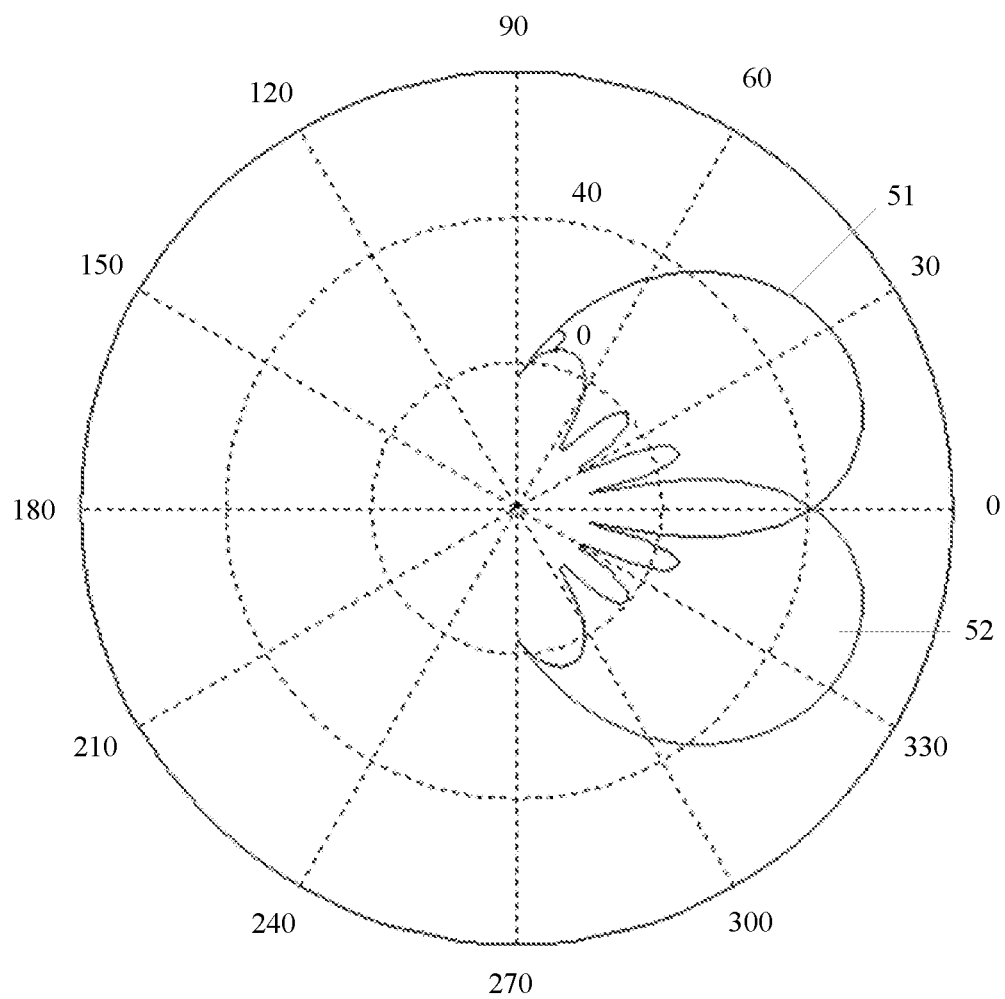
FIG. 4a is a schematic diagram of beams of two cells according to an embodiment of the present invention.

A weight in a beam weight vector of each cell is corresponding to a channel of the antenna. A channel to which data obtained after the weighted processing is mapped is a channel corresponding to a weight. After processing according to the foregoing formula, a beam transmitted by the first antenna is shown in FIG. 4a. It can be seen from FIG. 4a that, in this case, the first antenna transmits two beams 51 and 52 that have different directions, the two beams separately cover one cell, and there is a relatively small overlapping part between the two beams.

Similarly, an 8-channel antenna is used as an example to separately describe how to perform weighted processing on a time-frequency resource allocated in a joint allocation manner and a time-frequency resource allocated in an independent allocation manner, so as to form a beam directed at a terminal.

1. Independent weighted processing is performed on data carried on a time-frequency resource allocated in the independent allocation manner:

$$\begin{bmatrix} Y^0(n_s, k, l) \\ Y^1(n_s, k, l) \\ Y^2(n_s, k, l) \\ Y^3(n_s, k, l) \\ Y^4(n_s, k, l) \\ Y^5(n_s, k, l) \\ Y^6(n_s, k, l) \\ Y^7(n_s, k, l) \end{bmatrix} = \begin{bmatrix} w_{00} & w_{01} \\ w_{10} & w_{11} \\ w_{20} & w_{21} \\ w_{30} & w_{31} \\ w_{40} & w_{41} \\ w_{50} & w_{51} \\ w_{60} & w_{61} \\ w_{70} & w_{71} \end{bmatrix} \begin{bmatrix} 1 & 0 \\ 0 & 1 \end{bmatrix} \begin{bmatrix} S^0_{sectorX}(n_s, k, l) \\ S^1_{sectorX}(n_s, k, l) \end{bmatrix},$$

where $n_s$ represents a timeslot, k represents a carrier, l represents a symbol, and a resource block can be uniquely identified by using an index ($n_s$, k, l); $S^m_{sectorX}(n_s,k,l)$ represents data of a time-frequency resource block ($n_s$, k, l) corresponding to a data stream m of a terminal in a cell X, and $Y^i(n_s,k,l)$ represents data of an $i^{th}$ channel corresponding to the time-frequency resource block ($n_s$, k, l).

2. Joint weighted processing is performed on data carried on a time-frequency resource allocated in the joint allocation manner:

$$\begin{bmatrix} Y^0(n_s, k, l) \\ Y^1(n_s, k, l) \\ Y^2(n_s, k, l) \\ Y^3(n_s, k, l) \\ Y^4(n_s, k, l) \\ Y^5(n_s, k, l) \\ Y^6(n_s, k, l) \\ Y^7(n_s, k, l) \end{bmatrix} = \begin{bmatrix} w_{00} & w_{01} & w_{02} & w_{03} \\ w_{10} & w_{11} & w_{12} & w_{13} \\ w_{20} & w_{21} & w_{22} & w_{23} \\ w_{30} & w_{31} & w_{32} & w_{33} \\ w_{40} & w_{41} & w_{42} & w_{43} \\ w_{50} & w_{51} & w_{52} & w_{53} \\ w_{60} & w_{61} & w_{62} & w_{63} \\ w_{70} & w_{71} & w_{72} & w_{73} \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} S^0_{sector\,0}(n_s, k, l) \\ S^1_{sector\,0}(n_s, k, l) \\ S^0_{sector\,1}(n_s, k, l) \\ S^1_{sector\,1}(n_s, k, l) \end{bmatrix},$$

where $n_s$ represents a timeslot, k represents a carrier, l represents a symbol, and a resource block can be uniquely identified by using an index ($n_s$, k, l); $S^m_{sectorX}(n_s,k,l)$ represents data of a time-frequency resource block ($n_s$, k, l) corresponding to a data stream m of a terminal in a cell n, and $Y^i(n_s,k,l)$ represents data of an $i^{th}$ channel corresponding to the time-frequency resource block ($n_s$, k, l).

A weight vector (that is, a service beam weight vector) used to direct a beam at a terminal that camps on two cells may be set according to an actual requirement, so as to direct the beam transmitted by the antenna at the terminal. Specific implementation is well known by a person skilled in the art, and is not described in detail in the present invention.

It is easy to learn that, before step S202, the method of this embodiment may further include: allocating, by the base station, time-frequency resources of two cells.

Time-frequency resource allocation refers to determining data carried on a time-frequency resource.

Specifically, the allocating, by the base station, time-frequency resources of two cells may be implemented in any one of the following manners:

separately performing independent scheduling on the time-frequency resources of the two cells (independent scheduling for short hereinafter); or carrying same data by using same time-frequency resources of the two cells, or carrying data by using one of same time-frequency resources of the two cells, where another time-frequency resource in same time-frequency resources of the two cells does not carry data (joint scheduling for short hereinafter).

The independent scheduling refers to allocating a time-frequency resource of a cell to the cell or a terminal that camps on the cell, where resource scheduling between different cells does not affect each other. For example, the base station allocates a time-frequency resource of the first cell to the first cell, to carry data of the first cell; and the base station allocates a time-frequency resource of the second cell to the second cell, to carry data of the second cell.

The joint scheduling refers to allocating same time-frequency resources of the two cells to a same terminal (it is easy to learn that the terminal camps on one of the two cells). For example, for the first cell and the second cell, a terminal A is located in an overlapping area of the first cell and the second cell. In this case, time-frequency resources of the first cell and the second cell are all allocated to the terminal A, and the time-frequency resources of the first cell and the second cell are all used to carry data that is sent to the terminal A.

Alternatively, the joint scheduling indicates that, for a same time-frequency resource, only one cell in the two cells uses the time-frequency resource, and the other cell does not use the time-frequency resource. For example, for the first cell and the second cell, a terminal A is located in an overlapping area of the first cell and the second cell. In this case, a time-frequency resource of the first cell is allocated to the terminal A, and is used to carry data that is sent to the terminal A, and a time-frequency resource of the second cell is not used.

The joint scheduling is usually used to allocate a resource to a terminal that is in an overlapping area of two cells, so that channel interference between terminals in an overlapping coverage area of two neighboring cells can be reduced. It is easy to learn that in an ideal case, there is an excessively small overlapping area or even no overlapping area in two cells. In this case, a control channel resource may be allocated only in the independent allocation manner.

Step S203: The base station combines the data that is carried on the time-frequency resources of the two cells and that is obtained after the weighted processing, to obtain combined data.

It should be noted that in this embodiment, two cells may use a same frequency band, or two cells may use non-overlapping frequency bands, so as to achieve a scheduling effect of inter-frequency interference coordination.

Further, when two cells use non-overlapping frequency bands, operating frequency bands of the two cells may be set in the following two manners.

Figure 4B:
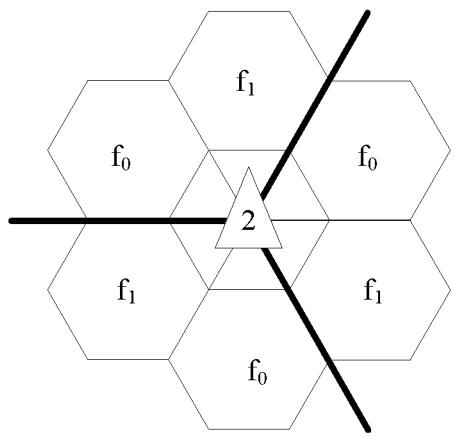
FIG. 4b is a schematic diagram of a frequency configuration of two cells according to an embodiment of the present invention.

First manner: Different cells use different frequencies. As shown in FIG. 4b, a base station 2 is equipped with three directional antennas, and each directional antenna is corresponding to two cells. A frequency used by one cell is f0, and a frequency used by the other cell is f1. In addition, neighboring cells use different frequencies.

Second manner: A frequency band set is set. The frequency band set includes multiple different frequency bands, and the base station dynamically selects a frequency band used by a cell for the cell from the frequency band set.

Step S203 may be implemented in the following manner:

when the two cells use a same frequency band, processing data of a same frequency according to the following formula: $(s1+s2+\ldots+Sn)*e^{jw0t}$, where n represents a quantity of cells covered by the first antenna, $n \geq 2$, S1 to Sn represent signals from all cells, w0 is frequency information of S1 to Sn, and $e^{jw0t}$ represents that a signal is modulated to a carrier whose frequency is w0; or when the two cells use non-overlapping frequency bands, processing data of different frequencies according to the following formula: $S1*e^{jw1t}+S2*e^{jw2t}+\ldots+Sn*e^{jw3t}$, where n represents a quantity of cells covered by the first antenna, S1 to Sn represent signals from all cells, w1 is frequency information of S1, w2 is frequency information of S2, ..., and wn is frequency information of Sn, and $e^{jwnt}$ represents that a signal is modulated to a carrier whose frequency is wn.

Further, in a specific implementation manner of step S203, step S203 may include:

separately combining, in a unit of cell into a frame, data carried on a time-frequency resource of each cell, to obtain frame data of each cell; and performing power normalization sum processing on frame data of the two cells.

More specifically, in this specific implementation manner, first, weighted processing is separately performed on data of each cell according to the foregoing step S202, to map the data to a corresponding antenna channel. Then, data mapped to each channel is separately combined into a frame, to obtain frame data of each channel in each cell. Next, inverse fast Fourier transform (Inverse Fast Fourier Transform, "IFFT" for short) processing is separately performed on obtained frame data of each channel in each cell. Finally, power normalization sum processing is performed on frame data that is on a same channel and that is obtained after the IFFT processing, and then after intermediate radio frequency processing, the frame data is radiated to an air interface by using the antenna.

It should be noted that this implementation manner is applicable to a case in which multiple cells use a same frequency band. The power normalization sum processing includes two processing processes: power normalization processing and sum processing. An order between the two processes is not limited in this embodiment. The normalization processing may be first performed, and then the sum processing is performed; or the sum processing may be first performed, and then the normalization processing is performed.

In this implementation manner, the power normalization processing is performed on the data, so as to avoid excessive power of a remote radio unit caused by excessively high digital domain power.

Further, in another specific implementation manner of step S203, step S203 may include:

simultaneously combining, in a unit of channel into frames, the data carried on the time-frequency resources of the two cells, to obtain frame data of the two cells.

In this embodiment, first, weighted processing is performed on data of each cell according to the foregoing step S202, to map the data to a corresponding antenna channel. Then, data that is mapped from the two cells to a same antenna channel is combined into a frame, to obtain frame data of the two cells. Finally, IFFT processing and intermediate radio frequency processing are performed on the frame data of the two cells, and then the frame data is radiated to an air interface by using the antenna.

This implementation manner is applicable to a case in which multiple cells use a same frequency band.

In this case, step S203 specifically includes:

Further, in still another specific implementation manner of step S203, step S203 may include:

separately combining, into a frame, data carried on a time-frequency resource of each cell, to obtain frame data of each cell; and performing frequency conversion and combination processing on a time-frequency resource that carries frame data of each cell.

Specifically, first, weighted processing is separately performed on data of each cell according to the foregoing S202, to map the data to a corresponding antenna channel. Then, data mapped to each channel is separately combined into a frame, to obtain frame data of each channel in each cell. Then, IFFT processing is separately performed on the obtained frame data of each channel in each cell, and intermediate frequency multi-carrier combination processing is performed on frame data of the two cells obtained after the IFFT processing. Finally, radio frequency processing is performed on frame data obtained after the intermediate frequency multi-carrier combination processing, and then the frame data is radiated to an air interface by using the antenna. The intermediate frequency multi-carrier combination processing refers to performing up-conversion on carriers of the two cells, and then combining the up-converted carriers. The combination refers to combining signals in different frequency bands for output.

This implementation manner is applicable to a case in which two cells use non-overlapping frequency bands.

Step S204: The base station transmits two directional beams by using the first antenna, where the two directional beams are used to send the combined data, the two directional beams have different directions, and the two directional beams are in a one-to-one correspondence with the two cells; or the base station transmits one directional beam by using the first antenna, where the directional beam is used to send the combined data, and a beam direction of the directional beam is directed by the base station according to a location of a single terminal in the at least two cells.

When the base station transmits two beams by using the first antenna, directions of at least two directional beams may be directed by the base station according to location distribution of all terminals in cells corresponding to the directional beams, or may be directed by the base station according to location distribution of a single terminal in cells corresponding to the directional beams.

Further, when the antenna transmits the foregoing data obtained after the weighted processing by using a cell beam weight vector, two formed directional beams respectively cover corresponding cells or cover partial areas (such as a central part, a left side, or a right side) of corresponding cells; in this case, the directional beams are directed according to location distribution of all terminals in cells corresponding to the directional beams. When the antenna transmits the foregoing data obtained after the weighted processing by using a service beam weight vector, two formed directional beams are respectively directed at terminals in corresponding cells; in this case, the directional beams are directed according to location distribution of a single terminal in cells corresponding to the directional beams.

Step S205: The base station receives a signal by using the first antenna. Step S205 is an optional step.

Step S206: The base station processes signals received by all channels of the first antenna, to obtain receive data of the two cells. Step S206 is an optional step.

In this embodiment of the present invention, a base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity. In addition, a beam that covers a cell is directed by processing a baseband signal. Therefore, this embodiment of the present invention may be implemented based on an existing base station antenna structure, so that hardware costs of an antenna system do not increase. In addition, the base station may determine, according to actual location distribution of terminals in a cell, that the first antenna transmits one directional beam or multiple directional beams, so that the implementation is flexible.

Figure 5:
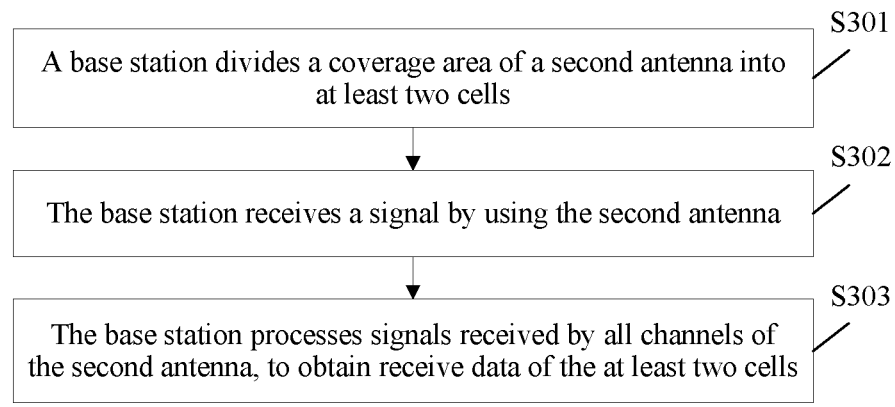
FIG. 5 is a flowchart of still another communications method according to an embodiment of the present invention.

FIG. 5 shows still another communications method according to an embodiment of the present invention. As shown in FIG. 5, the method includes:

Step S301: A base station divides a coverage area of a second antenna into at least two cells.

The base station has at least one antenna. The antenna may be a directional antenna, or may be an omnidirectional antenna. When the antenna is an omnidirectional antenna, the base station has one antenna; or when the antenna is a directional antenna, the base station has at least two antennas, for example, may have three 120-degree directional antennas. The second antenna is any one of the at least one antenna, and is configured to receive data carried on a time-frequency resource of a cell in a coverage area of the antenna.

The second antenna and the first antenna that is in the embodiment shown in FIG. 2 or FIG. 3 may be a same antenna.

Step S302: The base station receives a signal by using the second antenna.

Step S303: The base station processes signals received by all channels of the second antenna, to obtain receive data of the at least two cells.

Step S303 may include:

performing, by the base station in a unit of cell, single cell processing on the signals received by all channels of the second antenna; and simultaneously performing, by the base station, processing of the at least two cells on the signals received by all channels of the second antenna.

The performing, by the base station in a unit of cell, single cell processing on the signals received by all channels of the second antenna includes:

separately processing, by the base station by using a resource allocation parameter of each cell, the signals received by all channels of the second antenna, to obtain receive data of each cell. For example, the base station processes, by using a resource allocation parameter of a first cell, signals received by all channels, to obtain receive data of the first cell; then, the base station processes again, by using a resource allocation parameter of a second cell, the signals received by all channels, to obtain receive data of the second cell. A resource allocation parameter of a cell is used to indicate an allocation status of time-frequency resource allocation of the cell. The single cell processing is applicable to a case in which neighboring cells allocate a same time-frequency resource to terminals in the respective cells.

The base station performs, by using resource allocation parameters of all cells, joint detection processing on the signals received by all channels of the second antenna. The joint detection processing indicates that, the base station simultaneously processes, by using the resource allocation parameters of all cells, the signals received by all channels of the second antenna, to obtain receive data of the cells. For example, signals received by all channels are simultaneously processed by using a resource allocation parameter of a first cell and a resource allocation parameter of a second cell, to obtain receive data of the first cell and the second cell. The joint processing is applicable to a case in which neighboring cells allocate a same time-frequency resource to terminals in the respective cells, or a case in which a terminal of only one cell in neighboring cells uses a time-frequency resource. During implementation, the joint detection processing may be implemented by using an interference suppression combination technology.

It should be noted that the second antenna in this embodiment and the first antenna in the embodiment shown in FIG. 2 or FIG. 3 may be a same antenna, or may be independent different antennas.

In this embodiment of the present invention, a base station receives signals of at least two cells by using a second antenna. These cells have their own transmission bandwidth. For a coverage area of an antenna, total transmission bandwidth that can be used dramatically increases, thereby improving a network capacity. In addition, the base station may process, in a unique manner, the signals received by the second antenna, to obtain receive data of the at least two cells, so that applicability is wide.

Figure 6:
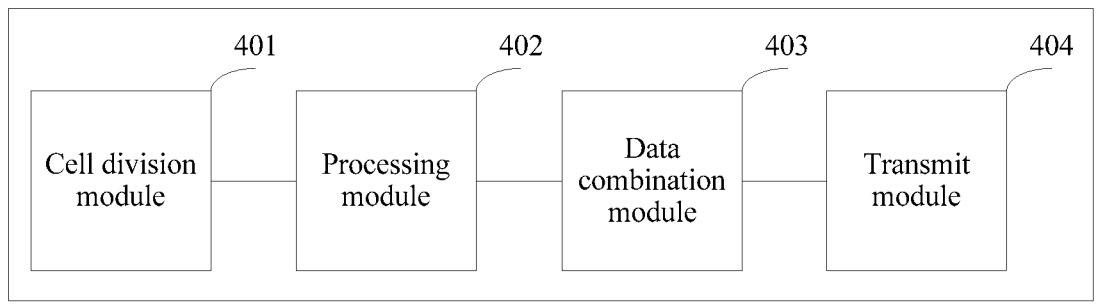
FIG. 6 is a schematic structural diagram of a communications apparatus according to an embodiment of the present invention.

FIG. 6 shows a communications apparatus according to an embodiment of the present invention. The communications apparatus may be a base station. As shown in FIG. 6, the communications apparatus includes:

a processing module 401, configured to: divide a coverage area of a first antenna of a base station into at least two cells, where the base station has at least one antenna, and the first antenna is any one of the at least one antenna; perform weighted processing on data carried on time-frequency resources of the at least two cells, to map the data carried on the time-frequency resources of the at least two cells to a channel of the first antenna; and combine the data that is carried on the time-frequency resources of the at least two cells and that is obtained after the weighted processing, to obtain combined data; and a transmit module 402, configured to: transmit at least two directional beams by using the first antenna, where the at least two directional beams are used to send the combined data, the at least two directional beams have different directions, the at least two directional beams are in a one-to-one correspondence with the at least two cells, and beam directions of the at least two directional beams are directed according to location distribution of all terminals in cells corresponding to the directional beams; or transmit one directional beam by using the first antenna, where the directional beam is used to send the combined data, and a beam direction of the directional beam is directed according to a location of a single terminal in the at least two cells.

During implementation, the transmit module 402 may be further configured to transmit at least two directional beams by using the first antenna, where the at least two beams are used to send the combined data, the at least two directional beams have different directions, the at least two directional beams are in a one-to-one correspondence with the at least two cells, and the at least two directional beams are directed at terminals in corresponding cells; for example, an example in which two beams are corresponding to two cells is used: One directional beam is directed at a terminal a in a cell A, and the other directional beam is directed at a terminal b in a cell B.

In this embodiment of the present invention, a base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity. In addition, a beam that covers a cell is directed by processing a baseband signal. Therefore, this embodiment of the present invention may be implemented based on an existing base station antenna structure, so that hardware costs of an antenna system do not increase. In addition, the base station may determine, according to actual location distribution of terminals in a cell, that the first antenna transmits one directional beam or multiple directional beams, so that the implementation is flexible.

Figure 7:
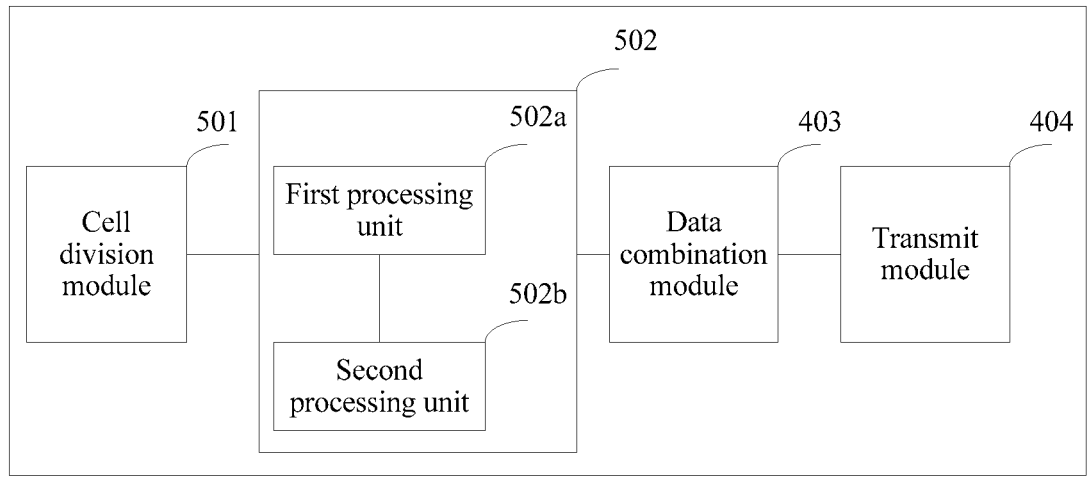
FIG. 7 is a schematic structural diagram of another communications apparatus according to an embodiment of the present invention.

FIG. 7 shows another communications apparatus according to an embodiment of the present invention. The communications apparatus may be a base station. As shown in FIG. 7, the communications apparatus includes:

a processing module 501, configured to: divide a coverage area of a first antenna of a base station into at least two cells, where the base station has at least one antenna, and the first antenna is any one of the at least one antenna; perform weighted processing on data carried on time-frequency resources of the at least two cells, to map the data carried on the time-frequency resources of the at least two cells to a channel of the first antenna; and combine the data that is carried on the time-frequency resources of the at least two cells and that is obtained after the weighted processing, to obtain combined data; and a transmit module 502, configured to: transmit at least two directional beams by using the first antenna, where the at least two directional beams are used to send the combined data obtained by the processing module 501, the at least two directional beams have different directions, the at least two directional beams are in a one-to-one correspondence with the at least two cells, and beam directions of the at least two directional beams are directed according to location distribution of all terminals in cells corresponding to the directional beams; or transmit one directional beam by using the first antenna, where the directional beam is used to send the combined data obtained by the processing module 501, and a beam direction of the directional beam is directed according to a location of a single terminal in the at least two cells.

In an implementation manner of this embodiment, the processing module 501 may be specifically configured to multiply data carried on a time-frequency resource of each cell by a directional beam weight vector of the cell, to obtain data that is mapped from the time-frequency resource to each channel of the first antenna.

Specifically, the processing module 501 may be specifically configured to: multiply the data carried on the time-frequency resource of each cell by a cell beam weight vector of the cell, where the cell beam weight vector is used to form a directional beam that covers a corresponding cell or covers a part of an area of a corresponding cell; or multiply the data carried on the time-frequency resource block of each cell by a service beam weight vector of the cell, where the service beam weight vector is used to form a directional beam directed at a terminal in the cell.

Optionally, the service beam weight vector may be a beam weight obtained by means of feature decomposition of a channel of a terminal to which a time-frequency domain resource in the cell is allocated; or the service beam weight vector may be a weight codebook fed back by a terminal to which a time-frequency domain resource in the cell is allocated.

Optionally, the directional beam weight vector may be further used to control transmit power of the directional beam, and the transmit power is determined according to a network key performance indicator.

In another implementation manner of this embodiment, the at least two cells may use a same frequency band or the at least two cells may use non-overlapping frequency bands.

In still another implementation manner of this embodiment, the processing module 501 may be specifically configured to:

when the at least two cells use a same frequency band, process data of a same frequency according to the following formula: $(s1+s2+\ldots+Sn)*e^{jw0t}$, where n represents a quantity of cells covered by the first antenna, n≥2, S1 to Sn represent signals from all cells, and w0 is frequency information of S1 to Sn; or when the at least two cells use non-overlapping frequency bands, process data of different frequencies according to the following formula: $S1*e^{jw1t}+S2*e^{jw2t}+\ldots+Sn*e^{jwnt}$, where n represents a quantity of cells covered by the first antenna, n≥2, S1 to Sn represent signals from all cells, w1 is frequency information of S1, w2 is frequency information of S2, ..., and wn is frequency information of Sn.

In this embodiment of the present invention, a base station sends data of at least two cells by using at least two beams that have different directions and that are transmitted by a first antenna. The at least two beams transmitted by the first antenna are in a one-to-one correspondence with at least two cells obtained by dividing a coverage area of the first antenna. These cells have their own transmission bandwidth. For a coverage area of an antenna, total transmission bandwidth that can be used dramatically increases, thereby improving a network capacity. In addition, a beam that covers a cell is directed by processing a baseband signal. Therefore, this embodiment of the present invention may be implemented based on an existing base station antenna structure, so that hardware costs of an antenna system do not increase. In addition, the base station may determine, according to actual location distribution of terminals in a cell, that the first antenna transmits one directional beam or multiple directional beams, so that the implementation is flexible.

Figure 8:
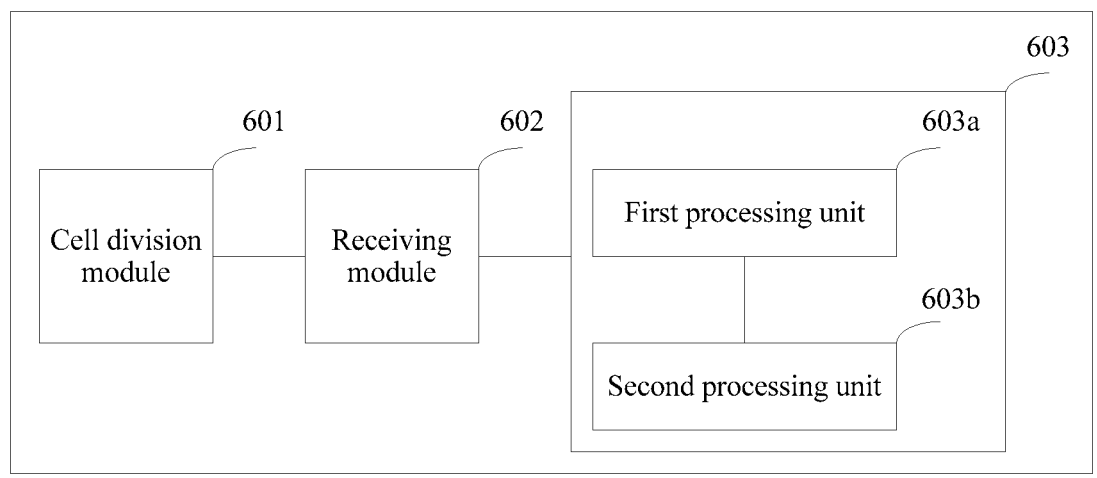
FIG. 8 is a schematic structural diagram of still another communications apparatus according to an embodiment of the present invention.

FIG. 8 shows still another communications apparatus according to an embodiment of the present invention. As shown in FIG. 8, the communications apparatus includes:

a receiving module 601, configured to receive a signal by using a second antenna; and a processing module 602, configured to: divide a coverage area of the second antenna into at least two cells, where the base station has at least one antenna, and the second antenna is any one of the at least one antenna; and process signals received by all channels of the second antenna, to obtain receive data of the at least two cells.

In this embodiment, the processing module 602 is specifically configured to: separately perform, in a unit of cell, single cell processing on the signals received by all channels of the second antenna; or simultaneously perform joint detection processing on the signals received by all channels of the second antenna.

In this embodiment of the present invention, a base station receives signals of at least two cells by using a second antenna. These cells have their own transmission bandwidth. For a coverage area of an antenna, total transmission bandwidth that can be used dramatically increases, thereby improving a network capacity. In addition, the base station may process, in a unique manner, the signals received by the second antenna, to obtain receive data of the at least two cells, so that applicability is wide.

Figure 9:
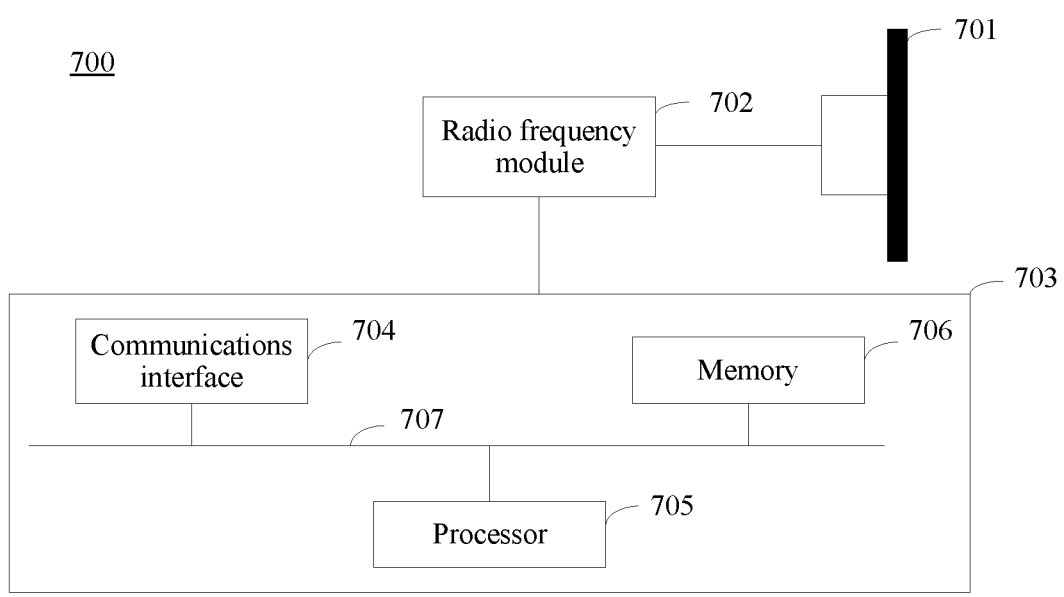
FIG. 9 is a schematic structural diagram of yet another communications apparatus according to an embodiment of the present invention.

FIG. 9 shows yet another communications apparatus according to an embodiment of the present invention. The communications apparatus may be a base station or a part of a base station, such as a BBU. As shown in FIG. 9, a base station 700 includes at least one antenna 701, a radio frequency module 702 (a remote radio unit (Radio Remote Unit, RRU for short) or a radio frequency unit (Radio Frequency Unit, RFU for short)), and a baseband unit (Building Base band Unit, BBU for short) 703. The BBU 703 is connected to the radio frequency module 702, and the radio frequency module 702 is connected to the antenna 701 by using a cable. In a downlink direction, the BBU 703 outputs a baseband signal to the radio frequency module 702. The radio frequency module 702 converts the baseband signal to an intermediate frequency signal, and then converts the intermediate frequency signal to a radio frequency signal. Then, the radio frequency signal is amplified by using a power amplification unit (for example, a radio frequency power amplifier). Finally, the amplified radio frequency signal is transmitted by using the antenna 701. In an uplink direction, a radio frequency signal from a terminal is transmitted to the radio frequency module 702 by using the antenna 701. The radio frequency module 702 first amplifies the radio frequency signal, converts the radio frequency signal to an intermediate frequency signal, converts the intermediate frequency signal to a baseband signal, and then outputs the baseband signal to the BBU 703.

Specifically, the radio frequency module 702 may include a digital intermediate frequency combination module, a digital-to-analog converter (Digital to Analog Converter, DAC for short), a transceiver module, and a multiple carrier power amplifier (Multiple Carrier Power Amplifier, MCPA for short) module. The BBU 703 transmits a multipath digital baseband signal to the digital intermediate frequency combination module. The digital intermediate frequency combination module performs frequency conversion and combination processing on the processed multipath digital baseband signal by using a digital intermediate frequency technology, to obtain a digital intermediate frequency signal. The DAC performs digital-to-analog conversion on the digital intermediate frequency signal, and outputs the digital intermediate frequency signal to the transceiver module. The transceiver module completes conversion from the intermediate frequency signal to a radio frequency signal. The MCPA amplifies the radio frequency signal obtained after the conversion performed by the transceiver module, and outputs the amplified radio frequency signal to the antenna 701 for transmitting.

In this embodiment, the BBU 703 includes a communications interface 704, a processor 705, a memory 706, and a communications bus 707.

The communications bus 707 is configured to implement connection and communication between the processor 705, the memory 706, and the communications interface 704.

The communications interface 704 implements communications connection between the processor 705 and another module (such as the radio frequency module 702 or the antenna 701), and may use a coaxial cable, or the like.

The memory 706 may be configured to store a software program and an application module. By running the software program and the application module that are stored in the memory 706, the processor 705 executes various functional applications and data processing of the apparatus. The memory 706 may mainly include a program storage area and a data storage area, where the program storage area may store an operating system, an application program (such as dividing a coverage area of a first antenna into at least two cells) that is required by at least one function, and the like; and the data storage area may store data (such as data that is carried on time-frequency resources of at least two cells and that is combined by a base station) that is created according to use of the device, and the like. In addition, the memory 706 may include a high-speed RAM (Random Access Memory, random access memory), and may further include a non-volatile memory (non-volatile memory), for example, at least one magnetic disk storage component, a flash memory component, or another volatile solid-state storage component.

The processor 705 is a control center of the base station 700. Various interfaces and lines are used to connect various parts of the entire apparatus. By running or executing the software program and/or the application module stored in the memory 706 and by invoking the data stored in the memory 706, the processor 705 executes various functions and data processing of the base station 700, so as to perform overall monitoring on the base station 700.

Specifically, by running or executing the software program and/or the application module stored in the memory 706 and by invoking the data stored in the memory 706, the processor 705 may divide a coverage area of a first antenna of a base station into at least two cells, where the base station has at least one antenna, and the first antenna is any one of the at least one antenna; perform weighted processing on data carried on time-frequency resources of the at least two cells obtained through dividing, to map the data carried on the time-frequency resources of the at least two cells to a channel of the first antenna; combine the data that is carried on the time-frequency resources of the at least two cells and that is obtained after the weighted processing, to obtain combined data; and transmit at least two directional beams by using the first antenna, where the at least two directional beams are used to send the combined data, the at least two directional beams have different directions, the at least two directional beams are in a one-to-one correspondence with the at least two cells, and beam directions of the at least two directional beams are directed according to location distribution of all terminals in cells corresponding to the directional beams; or transmit one directional beam by using the first antenna, where the directional beam is used to send the combined data, and a beam direction of the directional beam is directed according to a location of a single terminal in the at least two cells.

Further, the processor 705 may multiply data carried on a time-frequency resource of each cell by a directional beam weight vector of the cell, to obtain data that is mapped from the time-frequency resource to each channel of the first antenna.

Further, the processor 705 may multiply the data carried on the time-frequency resource of each cell by a cell beam weight vector of the cell, where the cell beam weight vector is used to form a directional beam that covers a corresponding cell or covers a part of an area of a corresponding cell; or multiply the data carried on the time-frequency resource block of each cell by a service beam weight vector of the cell, where the service beam weight vector is used to form a directional beam directed at a terminal in the cell.

The service beam weight vector may be a beam weight obtained by means of feature decomposition of a channel of a terminal to which a time-frequency domain resource in the cell is allocated; or the service beam weight vector may be a weight codebook fed back by a terminal to which a time-frequency domain resource in the cell is allocated.

Preferably, the directional beam weight vector may be further used to control transmit power of the directional beam, and the transmit power is determined according to a network key performance indicator.

Optionally, the at least two cells may use a same frequency band or the at least two cells may use non-overlapping frequency bands.

Further, the processor 705 may: when the at least two cells use a same frequency band, process data of a same frequency according to the following formula: $(s1+s2+\ldots+Sn)*e^{jw0t}$, where n represents a quantity of cells covered by the first antenna, n≥2, S1 to Sn represent signals from all cells, w0 is frequency information of S1 to Sn, and $e^{jw0t}$ represents that a signal is modulated to a carrier whose frequency is w0; or when the at least two cells use non-overlapping frequency bands, process data of different frequencies according to the following formula: $S1*e^{jw1t}+S2*e^{jw2t}+\ldots+Sn*e^{jwnt}$, where n represents a quantity of cells covered by the first antenna, n≥2, S1 to Sn represent signals from all cells, w1 is frequency information of S1, w2 is frequency information of S2, ..., and wn is frequency information of Sn, and $e^{jwnt}$ represents that a signal is modulated to a carrier whose frequency is wn.

In another embodiment, the processor 705 may divide a coverage area of a second antenna into at least two cells, where the base station has at least one antenna, and the second antenna is any one of the at least one antenna; receive a signal by using the second antenna; and process signals received by all channels of the second antenna, to obtain receive data of the at least two cells.

Further, the processor 705 may separately perform, in a unit of cell, single cell processing on the signals received by all channels of the second antenna, or simultaneously perform joint detection processing on the signals received by all channels of the second antenna.

In an example of this embodiment, a non-temporary computer readable storage medium that includes an instruction is further provided, for example, the memory 706 that includes an instruction. The instruction may be executed by the processor 705 of the base station 700 to complete the foregoing method. For example, the non-temporary computer readable storage medium may be a ROM, a random access memory (RAM), a CD-ROM, a tape, a floppy disk, an optical data storage device, or the like.

A non-temporary computer readable storage medium is provided. When an instruction in the storage medium is executed by a processor of a base station, the base station can execute the method of the embodiment corresponding to at least one of FIG. 2, FIG. 3, or FIG. 5.

The sequence numbers of the foregoing embodiments of the present invention are merely for illustrative purposes, and are not intended to indicate priorities of the embodiments.

It should be noted that, during communication implemented by the communications apparatus provided in the foregoing embodiment, division of the foregoing functional modules is used as an example for illustration. In actual application, the foregoing functions can be allocated to different functional modules and implemented according to a requirement, that is, an inner structure of an apparatus is divided into different functional modules to implement all or part of the functions described above. In addition, the communications apparatus provided in the foregoing embodiment and the communications method embodiment pertain to a same concept. For a specific implementation process, refer to the method embodiment, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

The invention claimed is:

1. A communications method, wherein the method comprises:
   dividing, by a base station, a coverage area of a first antenna into at least two cells, wherein the base station has at least one antenna, and wherein the first antenna is any one of the at least one antenna;
   performing, by the base station, weighted processing on data carried on time-frequency resources of the at least two cells, wherein the weighted processing maps the data carried on the time-frequency resources of the at least two cells to a channel of the first antenna;
   after performing the weighted processing on the data carried on the time-frequency resources of the at least two cells, combining, by the base station, the data carried on the time- frequency resources of the at least two cells to obtain combined data;
   determining, by the base station, whether one directional beam or at least two directional beams are to be transmitted;
   in response to determining that the at least two directional beams are to be transmitted, transmitting, by the base station, the at least two directional beams by using the first antenna, wherein the at least two directional beams are used to send the combined data, wherein the at least two directional beams have different directions, wherein the at least two directional beams are in a one-to-one correspondence with the at least two cells, and wherein beam directions of the at least two directional beams are directed by the base station according to location distribution of all terminals in cells corresponding to the directional beams; and
   in response to determining that the one directional beam is to be transmitted, transmitting, by the base station, the one directional beam by using the first antenna, wherein the directional beam is used to send the combined data, and wherein a beam direction of the directional beam is directed by the base station according to a location of a single terminal in the at least two cells.

2. The method according to claim 1, wherein the performing, by the base station, weighted processing on data carried on time-frequency resources of the at least two cells comprises:

multiplying, by the base station, data carried on a time-frequency resource of each cell by a directional beam weight vector of the cell to obtain data that is mapped from the time-frequency resource to each channel of the first antenna.

3. The method according to claim 2, wherein the multiplying, by the base station, data carried on a time-frequency resource of each cell by a directional beam weight vector of the cell to obtain data that is mapped from the time-frequency resource to each channel of the first antenna comprises one of:

multiplying, by the base station, the data carried on the time-frequency resource block of each cell by a cell beam weight vector of the cell, wherein the cell beam weight vector is used to form a directional beam that covers a corresponding cell or covers a part of an area of a corresponding cell; or multiplying, by the base station, the data carried on the time-frequency resource block of each cell by a service beam weight vector of the cell, wherein the service beam weight vector is used to form a directional beam directed at a terminal in the cell.

4. The method according to claim 3, wherein the service beam weight vector is one of:

a beam weight obtained by feature decomposition of a channel of a terminal to which a time-frequency domain resource in the cell is allocated; or a weight codebook fed back by a terminal to which a time-frequency domain resource in the cell is allocated.

5. The method according to claim 3, wherein the directional beam weight vector is used to control transmit power of the directional beam, and wherein the transmit power is determined according to a network key performance indicator (KPI).

6. The method according to claim 1, wherein the at least two cells use a same frequency band or the at least two cells use non-overlapping frequency bands.

7. The method according to claim 1, wherein the combining, by the base station, the data carried on the time-frequency resources of the at least two cells comprises:

when the at least two cells use a same frequency band, processing data of a same frequency according to the following formula: $(S1+S2+ \ldots +Sn)*e^{jw0t}$, wherein n represents a quantity of cells covered by the first antenna, wherein n≥2, wherein S1 to Sn represent signals from all cells, wherein w0 is frequency information of S1 to Sn, and wherein $e^{jw0t}$ represents that a signal is modulated to a carrier whose frequency is w0; and when the at least two cells use non-overlapping frequency bands, processing data of different frequencies according to the following formula: $S1*e^{jw1t}+S2*e^{jw2t}+ \ldots +Sn*e^{jwnt}$, wherein n represents a quantity of cells covered by the first antenna, wherein n≥2, wherein S1 to Sn represent signals from all cells, wherein w1 is frequency information of S1, w2 is frequency information of S2, . . . , and wn is frequency information of Sn, and wherein $e^{jwnt}$ represents that a signal is modulated to a carrier whose frequency is wn.

8. A communications method, wherein the method comprises:

dividing, by a base station, a coverage area of a second antenna into at least two cells, wherein the base station has at least one antenna, and wherein the second antenna is any one of the at least one antenna;

receiving, by the base station, a signal by using the second antenna; and processing, by the base station, signals received by all channels of the second antenna to obtain receive data of the at least two cells based on resource allocation parameters of the at least two cells, wherein a resource allocation parameter of a cell indicates a time-frequency resource allocation status of the cell.

9. The method according to claim 8, wherein the processing, by the base station, signals received by all channels of the second antenna to obtain receive data of the at least two cells comprises at least one of:

separately performing, by the base station in a unit of cell, single cell processing on the signals received by all channels of the second antenna; or simultaneously performing, by the base station, joint detection processing on the signals received by all channels of the second antenna.

10. A communications apparatus, wherein the apparatus comprises:

at least one processor;

a non-transitory computer-readable storage medium coupled to the at least one processor and storing programming instructions for execution by the at least one processor, wherein the programming instructions instruct the at least one processor to:

divide a coverage area of a first antenna of a base station into at least two cells, wherein the base station has at least one antenna, and wherein the first antenna is any one of the at least one antenna;

perform weighted processing on data carried on time-frequency resources of the at least two cells, wherein the weighted processing maps the data carried on the time-frequency resources of the at least two cells to a channel of the first antenna;

after performing the weighted processing on the data carried on the time-frequency resources of the at least two cells, combine the data carried on the time-frequency resources of the at least two cells to obtain combined data; and determine whether one directional beam or at least two directional beams are to be transmitted; and a transmitter, the transmitter configured to:

in response to determining that the at least two directional beams are to be transmitted, transmit the at least two directional beams by using the first antenna, wherein the at least two directional beams are used to send the combined data obtained by the at least one processor, wherein the at least two directional beams have different directions, wherein the at least two directional beams are in a one-to-one correspondence with the at least two cells, and wherein beam directions of the at least two directional beams are directed according to location distribution of all terminals in cells corresponding to the directional beams; and in response to determining that the one directional beam is to be transmitted, transmit the one directional beam by using the first antenna, wherein the directional beam is used to send the combined data obtained by the at least one processor, and wherein a beam direction of the directional beam is directed according to a location of a single terminal in the at least two cells.

11. The apparatus according to claim 10, wherein the programming instructions instruct the at least one processor to multiply data carried on a time-frequency resource of each cell by a directional beam weight vector of the cell to obtain data that is mapped from the time-frequency resource to each channel of the first antenna.

12. The apparatus according to claim 11, wherein the programming instructions instruct the at least one processor to:
    multiply the data carried on the time-frequency resource block of each cell by a cell beam weight vector of the cell, wherein the cell beam weight vector is used to form a directional beam that covers a corresponding cell or covers a part of an area of a corresponding cell; or
    multiply the data carried on the time-frequency resource block of each cell by a service beam weight vector of the cell, wherein the service beam weight vector is used to form a directional beam directed at a terminal in the cell.

13. The apparatus according to claim 12, wherein the service beam weight vector is one of a beam weight obtained by feature decomposition of a channel of a terminal to which a time-frequency domain resource in the cell is allocated or a weight codebook fed back by a terminal to which a time-frequency domain resource in the cell is allocated.

14. The apparatus according to claim 10, wherein the programming instructions instruct the at least one processor:
    when the at least two cells use a same frequency band, process data of a same frequency according to the following formula: $(S1+S2+\ldots+Sn)*e^{jw0t}$, wherein n represents a quantity of cells covered by the first antenna, wherein n≥2, wherein S1 to Sn represent signals from all cells, wherein w0 is frequency information of S1 to Sn, and wherein $e^{jw0t}$ represents that a signal is modulated to a carrier whose frequency is w0; or
    when the at least two cells use non-overlapping frequency bands, process data of different frequencies according to the following formula: $S1*e^{jw1t}+S2*e^{jw2t}+\ldots+Sn*e^{jwnt}$, wherein n represents a quantity of cells covered by the first antenna, wherein n≥2, wherein S1 to Sn represent signals from all cells, wherein w1 is frequency information of S1, w2 is frequency information of S2, . . . , and wn is frequency information of Sn, and wherein $e^{jwnt}$ represents that a signal is modulated to a carrier whose frequency is wn.

15. A communications apparatus, wherein the apparatus comprises:
    a receiver, the receiver configured to receive a signal by using a second antenna; at least one processor; and
    a non-transitory computer-readable storage medium coupled to the at least one processor and storing programming instructions for execution by the at least one processor, wherein the programming instructions instruct the at least one processor to:
        divide a coverage area of a base station associated with the second antenna into at least two cells, wherein the base station has at least one antenna, and wherein the second antenna is any one of the at least one antenna; and
        process signals received by all channels of the second antenna to obtain receive data of the at least two cells based on resource allocation parameters of the at least two cells, wherein a resource allocation parameter of a cell indicates a time-frequency resource allocation status of the cell.

* * * * *

UNITED STATES PATENT AND TRADEMARK OFFICE
CERTIFICATE OF CORRECTION

PATENT NO. : 10,879,976 B2
APPLICATION NO. : 15/963735
DATED : December 29, 2020
INVENTOR(S) : Pengcheng Zhang, Xiaojie Li and Zhaohong Song Page 1 of 1

It is certified that error appears in the above-identified patent and that said Letters Patent is hereby corrected as shown below:

In the Claims

In Column 22, Line 39, in Claim 1, delete "time- frequency" and insert -- time-frequency --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*